United States Patent
He et al.

(10) Patent No.: US 11,855,297 B2
(45) Date of Patent: Dec. 26, 2023

(54) BATTERY UNIT, BATTERY, AND ELECTRIC APPARATUS

(71) Applicant: CONTEMPORARY AMPEREX TECHNOLOGY CO., LIMITED, Ningde (CN)

(72) Inventors: Jianfu He, Ningde (CN); Yonghuang Ye, Ningde (CN); Qian Liu, Ningde (CN); Jingxuan Sun, Ningde (CN); Xiaofu Xu, Ningde (CN); Xueyang Sun, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/357,389

(22) Filed: Jul. 24, 2023

(65) Prior Publication Data
US 2023/0369701 A1  Nov. 16, 2023

Related U.S. Application Data

(63) Continuation of application No. PCT/CN2021/106110, filed on Jul. 13, 2021.

(51) Int. Cl.
H01M 50/242 (2021.01)

(52) U.S. Cl.
CPC ...... *H01M 50/242* (2021.01); *H01M 2220/20* (2013.01)

(58) Field of Classification Search
CPC .................................................. H01M 50/242
See application file for complete search history.

(56) References Cited

U.S. PATENT DOCUMENTS

2021/0194048 A1* 6/2021 Taniuchi ........... H01M 10/0562

FOREIGN PATENT DOCUMENTS

| CN | 201311953 Y | 9/2009 |
|---|---|---|
| CN | 103647105 A | 3/2014 |
| CN | 207896169 U | 9/2018 |
| CN | 209087934 U | 7/2019 |
| CN | 110915053 A | 3/2020 |
| JP | 2008016210 A | 1/2008 |

OTHER PUBLICATIONS

International Search Report for International Application PCT/CN2021/106110, dated Mar. 1, 2022.
Written Opinion of International Search Authority for International Application PCT/CN2021/106110, dated Mar. 1, 2022.

* cited by examiner

*Primary Examiner* — Jonathan G Jelsma
(74) *Attorney, Agent, or Firm* — Ladas & Parry LLP

(57) ABSTRACT

This application discloses a battery unit. The battery unit includes a housing, at least one cell, and a buffer. The at least one cell is accommodated in the housing, the buffer is disposed corresponding to a side wall of the cell, and the buffer is provided with an accommodating cavity. A periphery of the accommodating cavity includes at least one packaging structure, the packaging structure includes at least one level of packaging region with a predetermined length. When pressure in the accommodating cavity exceeds packaging strength of the packaging structure, the packaging region is opened to form a buffer space that communicates with the accommodating cavity, reducing influence caused by swelling of the cell.

17 Claims, 14 Drawing Sheets

BATTERY UNIT, BATTERY, AND ELECTRIC APPARATUS

CROSS REFERENCE TO RELATED APPLICATION

This application is a continuation of International Patent Application No. PCT/CN2021/106110, filed on Jul. 13, 2021, which is incorporated by reference in its entirety.

TECHNICAL FIELD

This application relates to the field of batteries, and specifically relates to a battery unit, a battery, and an electric apparatus.

BACKGROUND

Energy conservation and emission reduction are crucial to the sustainable development of the automotive industry. Electric vehicles, with their advantages in energy conservation and emission reduction, have become an important part of sustainable development of the automobile industry. For electric vehicles, battery technology is an important factor in connection with their development.

The inventors of this application have found in research that a cell of a current battery may swell due to increase of temperature and using time of the cell during charge and discharge in use, then extrude a battery housing, and bring a risk to use of a lithium battery.

SUMMARY

In consideration of the above problems, this application provides a battery unit, a battery, and an electric apparatus to resolve the above problems in the prior art.

According to a first aspect, an embodiment of this application provides a battery unit, including:

a housing; at least one cell, accommodated in the housing; and a buffer, accommodated in the housing and disposed corresponding to a side wall of the cell, where the buffer is provided with an accommodating cavity, a periphery of the accommodating cavity includes at least one packaging structure, the packaging structure includes at least one level of packaging region with a predetermined length, and when pressure in the accommodating cavity exceeds packaging strength of the packaging structure, the packaging region is opened to form a buffer space that communicates with the accommodating cavity.

The buffer being disposed corresponding to the side wall of the cell can effectively fill an initial gap between the cell and the housing and prevent a cell winding structure from loosening and causing lithium precipitation, and can also relieve pressure caused by swelling of the cell during swelling of the cell in use and reduce influence of swelling of the cell on an electrode plate.

Optionally, the side wall includes a middle side wall portion located in middle regions of two ends of the cell in a height direction, and the buffer is disposed corresponding to the middle side wall portion.

The buffer being disposed corresponding to the middle side wall portion of the cell can provide a buffer space for part of the cell with a maximum swelling force to relieve the pressure caused by swelling of the cell to the greatest extent.

Optionally, the buffer is disposed between the cell and a side wall of the housing; and/or the buffer is sandwiched between adjacent ones of the cells.

The buffer being disposed at different positions of the cell can resolve problems caused by swelling of the cell to the greatest extent based on features of the cell.

Optionally, the packaging structure is located at one or two ends of the buffer in the height direction of the cell.

Such arrangement manner can fully use space of the cell in the height direction in a cracking process of the packaging structure. This can fill the space of the cell in the height direction and can also facilitate cracking of the buffer in the height direction of the cell under an action of a swelling force of the cell.

Optionally, in the height direction of the cell, height of the accommodating cavity is 10-90% of height of the cell.

The height of the accommodating cavity being set to be in a specified proportion to the height of the cell can allow the packaging structure to be arranged in the space of the cell in the height direction and enable the buffer to be disposed more flexibly.

Optionally, the packaging structure includes at least two levels of packaging regions having different packaging strengths, enabling the packaging regions to be opened level by level as pressure in the accommodating cavity increases to form level by level the buffer space that communicates with the accommodating cavity.

Such arrangement manner can enable the packaging regions to be opened gradually as the swelling force of the cell increases gradually during use of the cell and enable the space of the accommodating cavity to be released gradually as the swelling force of the cell increases.

Optionally, the at least two levels of packaging regions are arranged sequentially; and/or the at least two levels of packaging regions are spaced apart, and a buffer region with a predetermined length is disposed between two adjacent levels of the packaging regions.

The packaging regions being arranged sequentially can enable the accommodating cavity to release the space gradually as the swelling force of the cell increases, avoid abrupt change of the space, make resistance applied to the cell by the buffer steadier, and significantly prolong service life of the battery unit. The packaging regions being spaced apart and the buffer region being disposed between the packaging regions can allow size adjustment of the space released by the packaging regions. Such arrangement is flexible.

Optionally, the at least two levels of packaging regions are arranged in the height direction of the cell, and the packaging region farther away from the accommodating cavity has a high packaging strength.

The above arrangement can enable the buffer to be very likely to expand gradually in the height direction of the cell and release space gradually as swelling pressure of the cell increases.

Optionally, the pressure in the accommodating cavity is greater than or equal to pressure in the battery unit.

The pressure in the accommodating cavity being greater than the pressure in the battery unit enables the accommodating cavity to generate a specified pressure on the cell, so as to enable the battery unit to still maintain a fully-filled state when the battery unit has a low group margin, thereby preventing lithium precipitation caused by wrinkles of the electrode plate.

Optionally, the packaging strength of the packaging structure is 0.1-50 MPa.

The packaging strength is set with comprehensive consideration on the pressure in the accommodating cavity and the pressure caused by swelling of the cell. This can enable the pressure in the accommodating cavity to generate pressure on the cell in an initial state and avoid lithium precipitation on the cell and can also enable the pressure in the accommodating cavity to gradually open the packaging structure under extrusion caused by the swelling force of the cell.

Optionally, the cell is a prismatic cell, and the buffer is disposed at one or two ends of the cell in a thickness direction; and/or the buffer is disposed at one or two ends of the cell in a width direction.

The buffer being flexibly disposed in all directions of the cell can relieve the swelling force of the cell in all directions.

Optionally, when the buffer is disposed at one or two ends of the cell in the thickness direction, width of the accommodating cavity is 50-100% of width of the cell in the width direction of the cell.

A ratio of the width of the accommodating cavity and the width of the cell is set, so that space can be flexibly reserved for the packaging structure based on performance of the cell, thereby reducing influence caused by swelling of the cell.

Optionally, a cross section of the accommodating cavity in the height direction of the cell is ring-shaped and persistently encircles the cell.

Such arrangement manner can form buffer around the cell, which can avoid lithium precipitation caused by shake of the cell and can also provide space for swelling of the cell in all directions around the cell when the cell swells.

Optionally, a material of the buffer is provided with an outer protection layer and an inner sealing layer, and the packaging region is formed by heat sealing of the inner sealing layer.

A manner of heat sealing of two layers of structures is used, featuring simple manufacture and a good sealing effect. In this way, various buffers adaptable to a structure of the cell can be easily manufactured.

Optionally, the accommodating cavity is filled with an inert fluid inside.

The accommodating cavity being filled with an inert substance inside avoids swelling of the accommodating cavity of the buffer caused by a substance or a material included in the buffer as the temperature of the cell increases, thereby avoiding extrusion on the swelling space for the cell caused by swelling of the buffer.

According to a second aspect, this application provides a battery, including the battery unit in the foregoing embodiment.

According to a third aspect, this application provides an electric apparatus, including the battery in the foregoing embodiment, where the battery is configured to supply electrical energy.

The foregoing description is merely an overview of the technical solutions of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are denoted by same reference signs. In the accompanying drawings.

Figure 1:
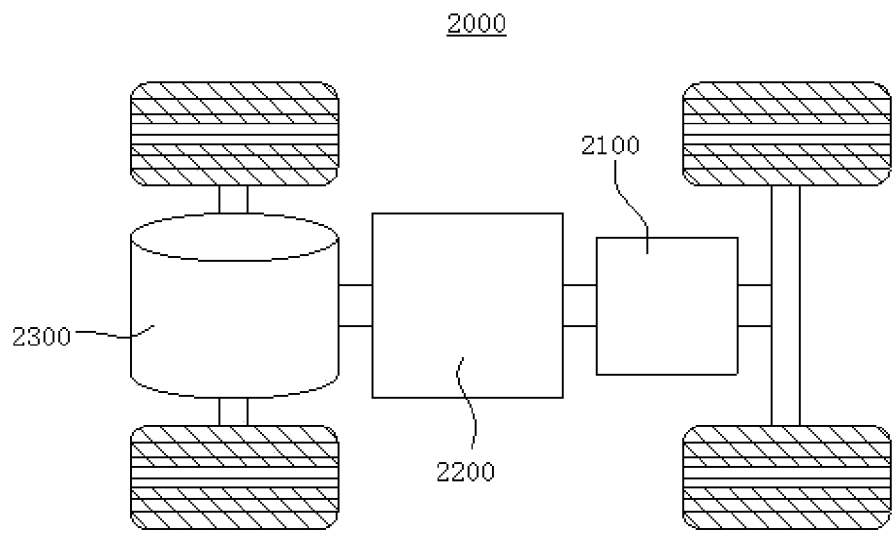
FIG. 1 is a schematic structural diagram of a vehicle according to an embodiment of this application.

Reference signs in specific embodiments are as follows:
Battery unit 1000;
housing 100;
cell 200;
first end 201;
first side wall 203;
tab 205;
first cell 210;
second cell 220;
second cell first side wall 2203;
second cell first corner 2205;
buffer 300;
aluminum-plastic film 301;
packaging structure 3010;
first buffer region 3011;
first packaging region 3012;

second buffer region 3013;
second packaging region 3014;
third buffer region 3015;
third packaging region 3016;
accommodating cavity 305;
first buffer 310;
first packaging structure 3110;
second buffer 320;
second packaging structure 3210;
ring-shaped buffer 330;
ring-shaped packaging structure 3310;
end cover 400;
vehicle 2000;
battery 2100;
busbar 2101;
controller 2200;
motor 2300;
box 2110;
upper box body 2111; and
lower box body 2112.

DETAILED DESCRIPTION

The following describes in detail the embodiments of technical solutions in this application with reference to the accompanying drawings. The following embodiments are merely used to describe technical solutions in this application more explicitly, and therefore they are merely used as examples and do not constitute a limitation on the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims, and the foregoing brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, specific sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the symbol "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on the embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, or an interaction between two elements. Persons of ordinary skill in the art can understand specific meanings of these terms in the embodiments of this application as appropriate to specific situations.

At present, with the development of technologies, traction batteries have been increasingly widely used. Traction batteries have been widely used in energy storage power supply systems such as hydroelectric power plants, thermal power plants, wind power plants, and solar power plants, and many other fields including electric transportation tools such as electric bicycles, electric motorcycles, and electric vehicles, military equipment, and aerospace. With continuous expansion of application fields of traction batteries, market demands for the traction batteries are also expanding.

The inventors of this application have noted that the cell may swell, that is, a negative electrode plate and a negative electrode plate swell outward as ions intercalate into and deintercalate from a positive electrode active substance and a negative electrode active substance during charge and discharge cycles of the battery. In particular, a middle region of the cell for lamination or winding swells more seriously. Swelling of the electrode plate causes an adverse effect on performance and service life of the battery, for example, swelling of the electrode plate may affect infiltration of electrolyte into the electrode plate, cause change of an ion migration path and lead to lithium precipitation; and the electrode plate may be broken after bearing a large extrusion force for a long time and cause a risk of short circuit in the battery. In addition, the electrolyte of the battery may be persistently consumed during charge and discharge cycles. After the cell is used for a period of time, local electrolyte exhaustion may even occur, and swelling of the cell may further aggravate local electrolyte shortage.

To relieve swelling of the cell, an elastic support plate may be disposed in the cell. Elastic shrinkage of the elastic support plate leaves space for swelling of the cell, so as to resolve a problem that a positive electrode plate and a negative electrode plate of a lithium-ion battery gradually loosen from a separator due to untight contact therebetween after a plurality of charge and discharge cycles. However, for the foregoing manner, this applicant has found through research that the elastic support plate having a large thickness and a heavy weight may occupy more space in the cell and may also lead to increase of mass of the cell and great loss of energy density of the cell. In addition, the elastic support plate includes a large number of metal parts, which may lead to a risk of dissolution of the metal parts during long-term use. Metal ions dissolved may precipitate on the surface of the electrode plate, leading to a risk of puncture of the separator. Moreover, the elastic support plate may lead to less compressible space in the cell and in turn may lead to sharp increase of the swelling force of the cell in the later period of use.

Based on the above considerations, to resolve a problem of deterioration in performance of the cell caused by the swelling force of the cell in use, through in-depth research, the inventors of this application design a new type of battery unit. The buffer being disposed in the housing of the battery unit may gradually release a swelling buffering space with gradual increase of the swelling force of the battery unit, which well resolves the problem of deterioration in the performance of the cell caused by swelling of the cell in use.

The battery unit disclosed in the embodiments of this application may be used without limitation on an electric apparatus such as a vehicle, a ship, or an aircraft. The battery unit, the battery, and the like disclosed in this application may be used to constitute a power supply system of the electric apparatus. This helps relieve and automatically adjust deterioration in the swelling force of the cell, and improve stability of the performance and service life of the battery.

An embodiment of this application provides an electric apparatus that uses a battery as a power source. The electric apparatus may be but is not limited to a mobile phone, a tablet, a laptop computer, an electric toy, an electric tool, an electric bicycle, an electric vehicle, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, an electric apparatus of an embodiment of the application being a vehicle 2000 is used as an example for description.

Referring to FIG. 1, FIG. 1 is a schematic structural diagram of a vehicle 2000 according to an embodiment of this application. The vehicle 2000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 2000 is provided with a battery 2100 inside, where the battery 2100 may be disposed at the bottom, front, or rear of the vehicle 2000. The battery 2100 may be configured to supply power to the vehicle 2000. For example, the battery 2100 may be used as an operational power source for the vehicle 2000. The vehicle 2000 may further include a controller 2200 and a motor 2300, where the controller 2200 is configured to control the battery 2100 to supply power to the motor 2300, for example, to satisfy power needs of start, navigation, and driving of the vehicle 2000.

In some embodiments of this application, the battery 2100 can be used as not only the operational power source for the vehicle 2000 but also a driving power source for the vehicle 2000, replacing or partially replacing fossil fuel or natural gas to provide driving traction for the vehicle 2000.

Figure 2:
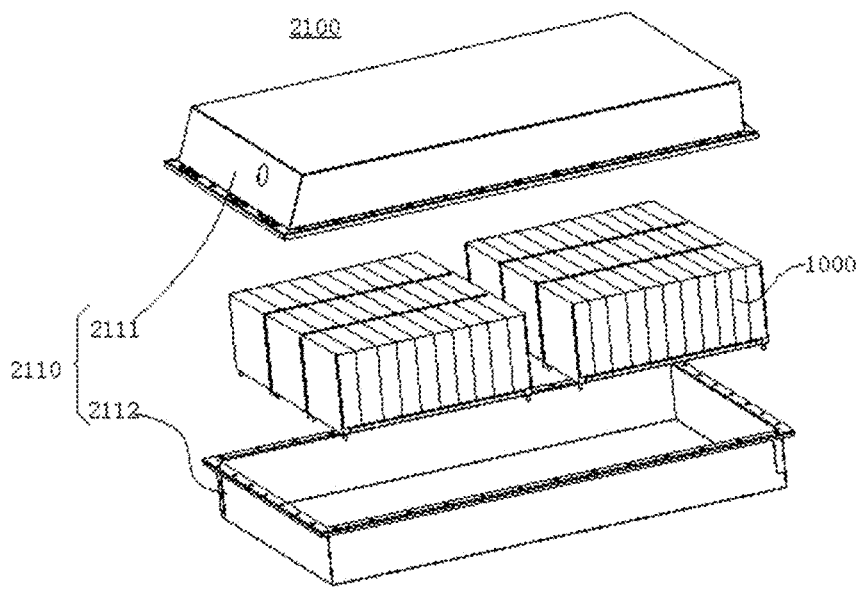
FIG. 2 is a schematic structural exploded view of a battery according to an embodiment of this application.

Referring to FIG. 2, FIG. 2 is an exploded view of a battery 2100 according to an embodiment of this application. The battery 2100 may include a box 2110 and a battery unit 1000, where the battery unit 1000 is accommodated in the box 2110. The box 2110 is configured to provide an accommodating space for the battery unit 1000. The box 2110 may be a variety of structures. In some embodiments, the box 2110 may include an upper box body 2111 and a lower box body 2112, where the upper box body 2111 and the lower box body 2112 fit together to jointly define a space for accommodating the battery unit 1000. The lower box body 2112 may be a hollow structure with one end open, the upper box body 2111 may be a plate structure, and the upper box body 2111 covers an open side of the lower box body 2112, so that the upper box body 2111 and the lower box body 2112 jointly define an accommodating space. The upper box body 2111 and the lower box body 2112 may both be a hollow structure with one side open, and the open side of the upper box body 2111 covers the open side of the lower box body 2112. Certainly, the box 2110 formed by the upper box body 2111 and the lower box body 2112 may be of a variety of shapes, for example, a cylinder or a cuboid.

The battery 2100 mentioned in the embodiments of this application is a single physical module that includes one or more battery units for providing a higher voltage and capacity. For example, the battery 2100 mentioned in this application may include a battery module, a battery pack, or the like. If a plurality of battery units 1000 are provided, the plurality of battery units 1000 may be connected in series, parallel, or series-parallel, where being connected in series-parallel means a combination of series and parallel connections of the plurality of battery units 1000. The plurality of battery units 1000 may be directly connected in series, parallel or series-parallel, and then an entirety of the plurality of battery units 1000 is accommodated in the box 2110; or certainly, the battery 2100 may be formed by a plurality of battery units 1000 being connected in series, parallel or series-parallel first to form a battery module and then a plurality of battery modules being connected in series, parallel or series-parallel to form an entirety which is accommodated in the box 2110. The battery 2100 may further include other structures. For example, the battery 2100 may further includes a busbar configured to implement electrical connection between the plurality of battery units 1000.

Each battery unit 1000 may be a lithium-ion secondary battery, a lithium-ion primary battery, a lithium-sulfur battery, a sodium-ion battery, or a magnesium-ion battery, without being limited thereto. The battery unit 1000 may be cylindrical, flat, cuboid, or of other shapes.

Figure 3:
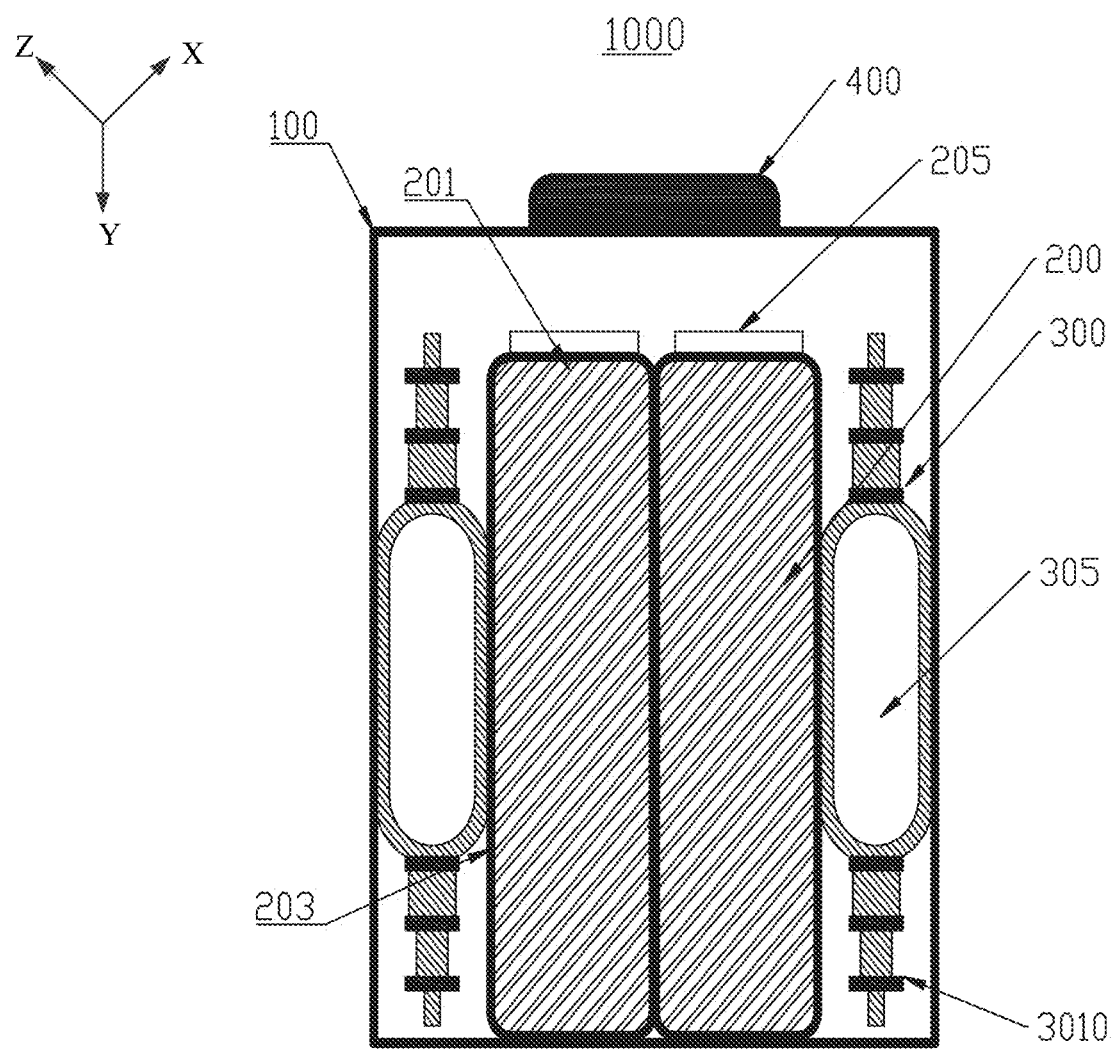
FIG. 3 is a cross-sectional view of a battery unit according to an embodiment of this application.

To further describe the battery unit provided in the embodiments of this application, referring to FIG. 3, for ease of description, in the embodiments of this application, a height direction of the cell is defined as a Y-axis direction, a thickness direction of the cell is defined as an X-axis direction, and a width direction of the cell is defined as a Z-axis direction. FIG. 3 is a cross-sectional view in the Y-axis direction of the battery unit 1000 provided in some embodiments of this application. The battery unit 1000 refers to a smallest independent element constituting a battery. As shown in FIG. 3, the battery unit 1000 includes a housing 100, a cell 200, an end cover 400, and other functional components.

The end cover 400 refers to a component that covers an opening of the housing 100 to isolate an internal environment of the battery unit from an external environment thereof. Without limitation, a shape of the end cover 400 may fit with a shape of the housing 100. Optionally, the end cover 400 may be made of a material with specified hardness and strength (for example, aluminum alloy), so that the end cover is less likely to deform under extrusion and collision, enabling the battery unit to have a higher structural strength and enhanced safety performance. The end cover may be provided with functional components such as an electrode terminal. The electrode terminal may be configured to be electrically connected to the cell for outputting or inputting electric energy of the battery unit. In some embodiments, the end cover may also be provided with a pressure relief mechanism configured to relieve internal pressure when the internal pressure or temperature in the battery unit reaches a threshold. The end cover may also be made of various materials, such as copper, iron, aluminum, stainless steel, aluminum alloy, and plastic, which are not particularly limited in the embodiments of this application. In some embodiments, an insulator may also be disposed on an inner side of the end cover. The insulator can be configured to isolate electrical connection parts in the housing from the end cover, reducing a risk of short circuit. For example, the insulator may be made of plastic, rubber, or the like.

The housing 100 is a component configured to form the internal environment of the battery unit together with the end cover 400, where the internal environment formed may be used to contain the cell, electrolyte, and other components. The housing 100 and the end cover 400 may be separate components, an opening may be provided in the housing 100, and the end cover covers the opening to form the internal environment of the battery unit. Without limitation, the end cover and the housing may also be integrated. Specifically, the end cover and the housing may form a shared connection surface before other components are disposed inside the housing, and then the end cover covers the housing when inside of the housing needs to be enclosed. The housing may be of various shapes and sizes, such as a rectangular shape, a cylindrical shape, and a hexagonal prism shape. Specifically, the shape of the housing may be determined based on a specific shape and size of a cell assembly. The housing may be made of various materials, such as copper, iron, aluminum, stainless steel, aluminum alloy, and plastic, which are not particularly limited in the embodiments of this application.

The cell 200 is a component in which electrochemical reactions take place in the battery unit 1000. There may be one or more cells in the housing. The cell is mainly formed by winding or stacking a positive electrode plate and a negative electrode plate, and a separator is generally disposed between the positive electrode plate and the negative electrode plate.

Parts of the positive electrode plate and the negative electrode plate with active substances constitute a body portion of the cell assembly, while parts of the positive electrode plate and the negative electrode plate without active substances separately constitute a tab. A positive tab and a negative tab may both be located at one end of the body portion or be located at two ends of the body portion respectively. During charge and discharge of the battery, a positive electrode active substance and a negative electrode active substance react with an electrolyte, and the tabs are connected to the electrode terminals to form a current loop.

Figure 4:
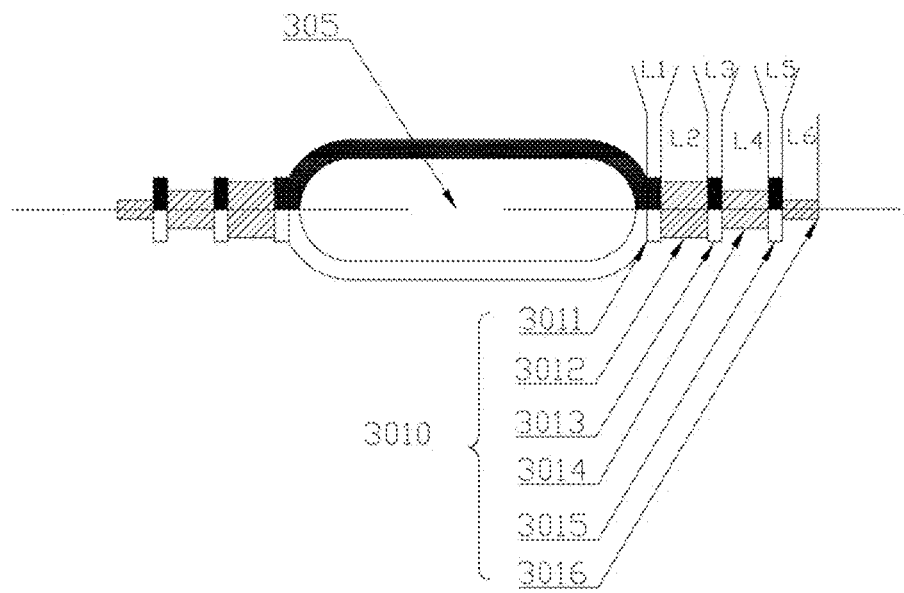
FIG. 4 is a cross-sectional view of a buffer according to an embodiment of this application.

As shown in FIG. 3 and FIG. 4, an embodiment of this application provides a battery unit 1000, including a housing 100 and at least one cell 200. The at least one cell 200 is accommodated in the housing 100. The battery unit 1000 further includes a buffer 300. The buffer 300 is accommodated in the housing 100 and disposed corresponding to a side wall of the cell 200. The buffer 300 is provided with an accommodating cavity 305, where a periphery of the accommodating cavity 305 includes at least one packaging structure 3010. The packaging structure 3010 includes at least one level of packaging region 3012 with a predetermined length. When pressure in the accommodating cavity 305 exceeds packaging strength of the packaging structure 3010, the packaging region 3012 is opened to form a buffer space that communicates with the accommodating cavity 305.

The buffer 300 accommodated in the housing 100 is a cavity structure which is provided with the accommodating cavity 305 inside and a periphery enclosed. The buffer 300 may be a bag structure, where the bag structure may be formed by a piece of flexible material that is edge-sealed after folded or may be formed by two pieces of flexible materials that are edge-sealed after disposed opposite each other.

The buffer 300 is disposed corresponding to a first side wall 203 of the cell 200 to fill a gap between the housing 100 and the first side wall 203 of the cell 100. In this application, the housing 100 provides an initial gap for swelling of the cell 200 in use. However, the presence of the initial hole gap increases a movement space of the cell 200 in the housing 100, enables a winding structure of the cell 200 to loosen, and in turn causes wrinkles of the positive electrode plate and the negative electrode plate and leads to lithium precipitation. For the structure of the battery unit 1000 provided in this embodiment of this application, the buffer 300 being disposed in the housing 100 can effectively and fully fill the gap to avoid lithium precipitation on the electrode plate.

The periphery of the accommodating cavity 305 of the buffer 300 includes at least one packaging structure 3010, where the packaging structure 3010 is used to seal the accommodating cavity. A packaging structure 3010 may be disposed at the periphery of the accommodating cavity 305. In this way, when the cell 200 swells with increase of using time of the battery, the accommodating cavity 305 can increase volume gradually as the cell 200 swells. A plurality of packaging structures 3010 may alternatively be disposed at the periphery of the accommodating cavity 305. In this way, a volume part increased may be disposed based on an internal space layout of the housing 100 of the battery unit, so that these internal gaps can be fully used to relieve pressure caused by swelling of the battery unit 100.

The packaging region 3012 is a structural region that is formed by pressing a packaging material at the periphery of the buffer 300 into a whole. After being pressed into a layer of integral material, the packaging material of the packaging region is unable to form the accommodating cavity. The packaging region 3012 may have different thicknesses based on magnitude of a pressing force. When the pressing force is large, the packaging region 3012 has a small thickness, so that a force for opening the packaging region is relatively large; and when the pressing force is small, the packaging region has a large thickness, so that the force for opening the packaging region is relatively small.

The packaging structure 3010 includes at least one level of packaging region with a predetermined length. As shown in FIG. 4, the packaging structure 3010 at the periphery of the buffer 300 is provided with three levels of packaging regions having lengths of L2, L4, and L6. Each packaging region has a predetermined length. When the packaging region is opened to form upper and lower layers of packaging materials, a buffer space with a specified volume is formed by the packaging region. When the pressure on the accommodating cavity caused by extrusion during swelling of the cell 200 increases persistently to exceed a pressing pressure threshold of a first-level packaging region, the first-level packaging region is opened to communicate with the accommodating cavity. This increases the volume of the accommodating cavity and releases the pressure of the accommodating cavity. When the pressure on the accommodating cavity caused by extrusion during swelling of the cell 200 increases persistently to exceed a pressing pressure threshold of a second-level packaging region, the second-level packaging region is opened to continuously increase the volume of the accommodating cavity and relieve the pressure of the accommodating cavity. The length and the number of the packaging region may also be set based on actual needs. For example, the buffer 300 disposed in the housing 100 of the battery unit 1000 includes two levels of packaging regions, where the two levels of packaging regions may be opened separately on a condition that the pressure in the accommodating cavity increases persistently.

When the packaging region 3010 is opened to communicate with the accommodating cavity 305, the entire thickness of the buffer is reduced, so as to provide space for swelling of the cell. The accommodating cavity of the buffer 300 is extruded by swelling of the cell 200. When an extrusion force reaches a predetermined pressure value, the packaging region with a predetermined length at the periphery of the accommodating cavity is opened, which increases the volume of the accommodating cavity and transfers the swelling pressure to a peripheral region of the accommodating cavity. The packaging region of the buffer may be disposed based on the space in the housing 100, which can fully use space with a low swelling degree of two ends of the cell in the height direction and can also fully use a redundant space of a tab portion of the cell in the height direction. The buffer 300 may be made of a flexible material. The flexible material enables the accommodating cavity to have high deformability, so that the packaging structure of the buffer does not need to be disposed in strict correspondence to a gap space formed after swelling of the cell, and these gaps can be filled using pressure and the deformability of the flexible material.

Therefore, in conclusion, in the embodiments of this application, the buffer is disposed corresponding to the cell. In this way, on the one hand, the initial gap between the cell and the housing can be effectively and fully filled when the cell does not swell, thus preventing the cell winding structure from loosening and avoiding lithium precipitation on the electrode plate; and on the other hand, when the cell swells in use, the buffer may deform under extrusion caused by swelling of the cell; when the swelling pressure of the cell is small, the buffer has a small deformation; however, the packaging region of the buffer is opened gradually and the space of the accommodating cavity increases gradually as the swelling pressure of the cell gradually increases to some extent, so that the deformation of the buffer also increases gradually, thus relieving the pressure caused by swelling of the cell, implementing filling of the gap between the cell and the housing by the buffer in a full life cycle of the cell, reducing the influence of swelling of the cell on the electrode plate, and avoiding lithium precipitation.

In some embodiments of this application, the buffer is disposed corresponding to a middle side wall portion of the cell in the height direction. FIG. 3 is a cross-sectional view of the battery unit in the height direction (Y axis) of the cell, where a side wall of the cell refers to an outer wall of the cell 200 parallel to the height direction (Y axis) and includes an outer wall of the cell in the thickness direction (X axis) and an outer wall of the cell in the width direction (Z axis). The cell is provided with a tab 205 in the height direction (Y axis). In the battery unit, there is a gap between the side wall of the cell and the side wall of the housing and between the tab of the cell and the housing. The swelling force of the cell may be generated in all directions of the cell during use of the battery unit, where the directions include a side wall direction of the cell and a tab direction of the cell. Therefore, the buffer may be disposed at any part of the cell to fill the gap and relieve the swelling force caused by swelling of the cell.

The inventors of this application have found in research that, during use of the battery unit, the swelling forces of the cell in its thickness direction and width direction are the most obvious and cause the most serious influence on the cell. In the embodiments of this application, the buffer 300 is disposed corresponding to the middle side wall portion of the cell 200, where the middle side wall portion is divided into middle regions of two ends of the cell in the height direction and includes a side wall of the cell in the thickness direction (X-axis direction) and a side wall of the cell in the width direction (Z-axis direction). The buffer 300 being disposed corresponding to the middle side wall portion of the cell 200 refers to that the buffer 300 and the cell 200 are disposed in the housing 100, and at least part of the buffer 300 fits with the middle side wall of the cell 200. As shown in FIG. 3, the buffer 300 fits with the first side wall 203 of the cell, and the buffer 300 is located on the middle side wall portion of the cell 200. In the embodiments of this application, the buffer 300 being disposed corresponding to the middle side wall portion of the cell 200 can relieve the swelling force of the cell 200 to the greatest extent.

According to some embodiments provided in this application, the buffer 300 may be disposed between the cell 200 and the side wall of the housing 100. Still referring to FIG. 3, the buffer 300 is disposed between the first side wall 203 of the cell and the side wall of the housing 100. In some embodiments, as shown in FIG. 3, the battery unit includes two cells 200, where the buffer 300 is disposed between each cell 200 and the side wall of the housing 100. When there is only one cell, the buffer may be disposed at a position corresponding to a side wall of the cell, and another side of the cell abuts against the side wall of the housing. The buffer may alternatively be disposed between two side walls of the cell 200 and the side wall of the housing 100.

Figure 5:
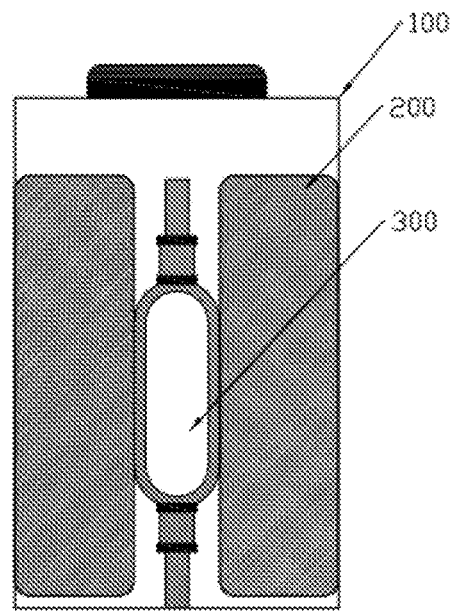
FIG. 5 is a cross-sectional view of another battery unit according to an embodiment of this application.

According to some embodiments provided in this application, optionally, the buffer 300 may alternatively be disposed between adjacent cells 200. FIG. 5 shows a structure of another battery unit 1000. The battery unit 1000 includes a housing 100, cells 200, and a buffer 300, where the cell 200 and the buffer 300 are disposed in the housing, and the buffer 300 is disposed between the adjacent cells 200; and one side of the cell 200 is disposed corresponding to a side wall of the housing 100, and another side thereof is disposed corresponding to the buffer 300. With use of the structure of the battery unit shown in FIG. 5, when the cell swells, the cell may swell toward one side of the buffer to extrude the buffer from two sides, and the buffer gradually opens a packaging region to provide a buffer space for swelling of the cell. The battery unit occupies a small space, so that the battery unit has a high group margin.

According to some embodiments, optionally, the buffer 300 and the cell 200 may alternatively be disposed in a hybrid manner, that is, the buffer may be disposed between the cell and the side wall of the housing and disposed between adjacent cells at the same time. In the structure of the battery unit shown in FIG. 3, in addition to that the buffer is respectively disposed between the side wall of the cell and the side wall of the housing, the buffer may also be disposed between the cells. In this way, in the structure of the battery unit shown in FIG. 3, two cells and three buffers fit each other. When there are a plurality of cells in the battery unit, the hybrid disposing manner provided in this embodiment can resolve a problem of swelling of the cells to the greatest extent.

According to some embodiments provided in this application, the packaging structure of the buffer 300 is located at one or two ends of the buffer 300 in the height direction of the cell. As shown in FIG. 3, the cell is provided with the tab 205 in the height direction (Y-axis direction), where a gap is present between the tab 205 and the housing 100. The packaging structure of the buffer 300 is disposed at the one or two ends of the buffer 300 in the height direction of the cell, which can relieve the pressure caused by swelling of the cell in use and can also help the packaging structure of the buffer expand toward a gap of the cell in the height direction to fill the gap of the cell in the height direction and avoid lithium precipitation on the cell. Further, the housing 100 is provided with an end cover 400 in a position corresponding to the tab 205. To release pressure in the cell, in structures of some battery units, the end cover 400 is further provided with a pressure relief mechanism configured to relieve internal pressure when the internal pressure or temperature in the battery unit reaches a threshold. The packaging structure of the buffer 300 is disposed at the one or two ends of the buffer 300 in the height direction of the cell. In this way, when a large enough swelling force is applied to the buffer by the cell, on a condition that all the packaging structures are opened, an inert substance in the accommodating cavity can conveniently release the pressure through the pressure relief mechanism on the end cover, thus reducing the influence caused by swelling of the cell.

Figure 6A:
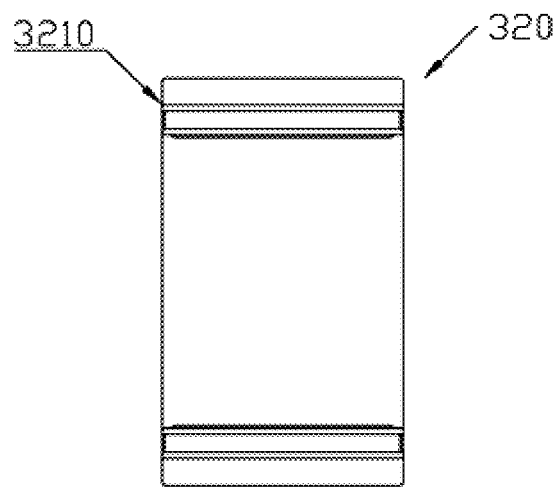
FIG. 6a is a schematic diagram of another buffer according to an embodiment of this application.
Figure 6B:
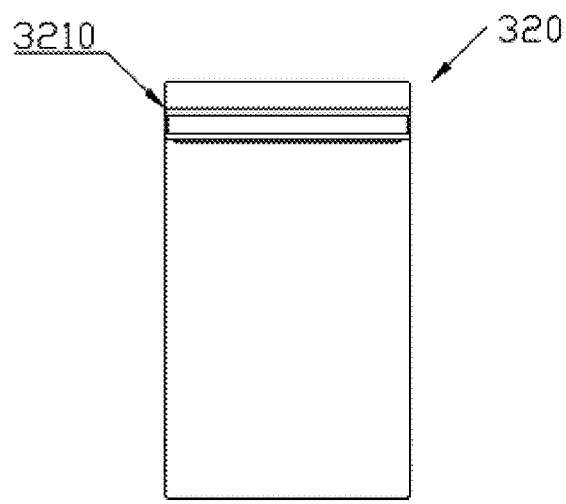
FIG. 6b is a schematic diagram of a second buffer according to an embodiment of this application.

FIG. 6a and FIG. 6b show a schematic diagram of arrangement of the packaging structure on the buffer. In FIG. 6a, the packaging structure 3210 is located at two ends of the buffer 320 in a height direction; and when the buffer fits with the cell and the height direction of the buffer is consistent with the height direction of the cell, the packaging structure 3210 is located at two ends of the buffer 320 in the height direction of the cell. During use of the cell, when the buffer 320 is extruded by the swelling force of the cell, the accommodating cavity extrudes the packaging structure from the two ends of the buffer in the height direction. This can release space for swelling of the cell and enable the packaging structure to expand toward a gap in the height direction of the cell to fill the gap in the height direction of the cell and avoid lithium precipitation on the cell. FIG. 6b shows another manner of arrangement of the packaging structure on the buffer. The packaging structure 3210 may alternatively be only disposed at one end of the buffer 320 in the height direction. As shown in FIG. 6b, one end of the buffer is provided with a packaging structure, and the other end thereof is an outer wall of the accommodating cavity. When the buffer 320 is extruded by the swelling force of the cell, the accommodating cavity extrudes the packaging structure from the one end of the buffer in the height direction, so that the packaging structure gradually cracks at the one end of the buffer in the height direction. This can release the space for swelling of the cell and gradually fill a gap of one end of the cell in the height direction.

In the foregoing embodiments, the packaging structure is disposed at the one or two ends of the cell in the height direction, which can relieve the pressure caused by swelling of the cell and can also help the packaging structure of the buffer expand toward a gap of the cell in the height direction to fill the gap of the cell in the height direction and avoid lithium precipitation on the cell.

Figure 6C:
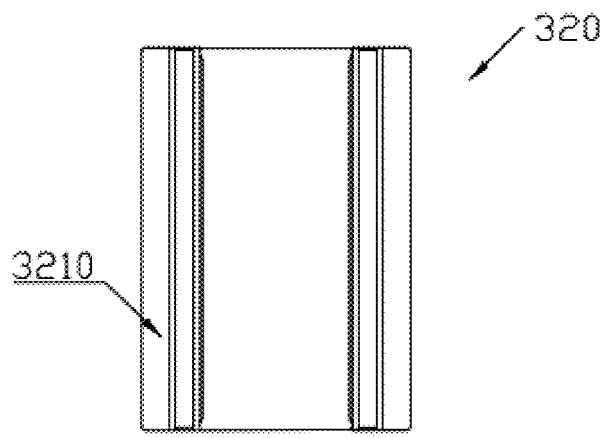
FIG. 6c is a schematic diagram of a third buffer according to an embodiment of this application.
Figure 6D:
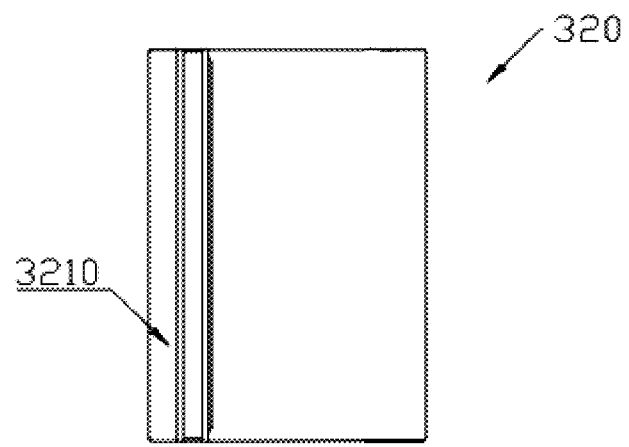
FIG. 6d is a schematic diagram of a fourth buffer according to an embodiment of this application.

Optionally, for fitting with different battery unit structures, some embodiments of this application further propose the packaging structure being disposed at one or two ends of the buffer in a width direction, as shown in FIG. 6c and FIG. 6d.

As shown in FIG. 6c, the packaging structure 3210 is located at two ends of the buffer in the width direction; and when the buffer 320 fits with the cell and the height direction of the buffer is consistent with the height direction of the cell, the packaging structure 3210 is located at two ends of the buffer in the width direction of the cell. When the buffer 320 is extruded by the swelling force of the cell, the accommodating cavity extrudes the packaging structure from the two ends of the buffer in the width direction, so that the packaging structure is opened gradually to release space gradually. Certainly, the packaging structure 3210 may alternatively be disposed at only one end of the buffer 320 in the width direction. As shown in FIG. 6d, the other end thereof is an outer wall of the accommodating cavity. When the buffer 320 is extruded by the swelling force of the cell, the accommodating cavity extrudes the packaging structure from the one end of the buffer in the width direction to release space gradually.

Figure 6E:
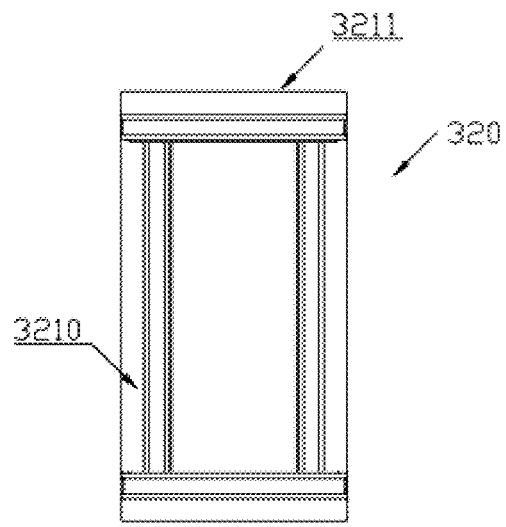
FIG. 6e is a schematic diagram of a fifth buffer according to an embodiment of this application.

Optionally, for fitting with different battery unit structures, some embodiments of this application further propose the packaging structures being disposed respectively at one or two ends of the buffer in the height direction and the width direction, as shown in FIG. 6e and FIG. 6.

Figure 6F:
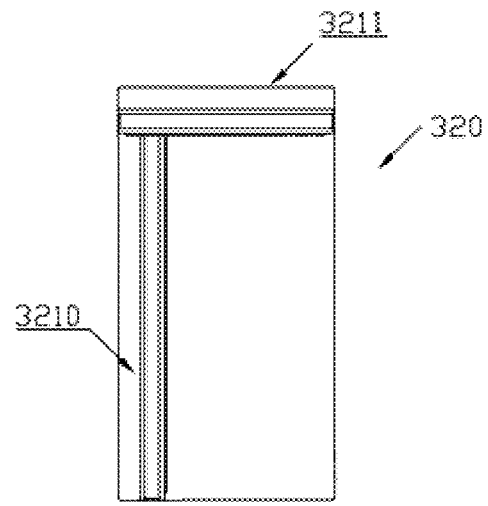
FIG. 6f is a schematic diagram of a sixth buffer according to an embodiment of this application.

As shown in FIG. 6e, the packaging structures 3210 and packaging structures 3211 are respectively located at two ends of the buffer in the width direction and two ends of the buffer in the height direction; and when the buffer 320 fits with the cell and the height direction of the buffer is consistent with the height direction of the cell, the packaging structures 3210 are located at two ends of the buffer in the width direction of the cell, and the packaging structures 3211 are located at two ends of the buffer in the height direction of the cell. When the buffer 320 is extruded by the swelling force of the cell, the accommodating cavity extrudes the packaging structures from the two ends of the buffer in the width direction and the height direction. In this way, the packaging structures can release space in four directions and can also release space quickly under extrusion caused by the swelling force of the cell. Certainly, the packaging structure 3210 may alternatively be disposed at only one end of the buffer 320 in the width direction, and the packaging structure 3211 may alternatively be disposed at only one end of the buffer 320 in the height direction. As shown in FIG. 6f, when the buffer 320 is extruded by the swelling force of the cell, the accommodating cavity extrudes the packaging structures from the one end of the buffer in the width direction and the one end of the buffer in the height direction to release space gradually.

The foregoing embodiments show an arrangement manner of the packaging structure on the buffer, where the packaging structure is located at one end and/or two ends of the buffer in the height direction and/or the width direction. In actual use, the packaging structure may be disposed in various manners based on actual needs and may alternatively be disposed at various positions in combination, without departing from the scope of the content described in the foregoing embodiments of this application.

According to some embodiments provided in this application, in the height direction of the cell, height of the accommodating cavity is 10-90% of height of the cell. The height of the accommodating cavity may be flexibly set based on the performance of the cell. When the cell has a large swelling coefficient, a small accommodating cavity may be provided, and a plurality of packaging structures are arranged in a rest height region. This can enable the accommodating cavity of the buffer to open the packaging structure and gradually release a large space under extrusion caused by the swelling force of the cell. For example, when the swelling force of the cell is large, the height of the accommodating cavity is set to be 10% of the height of the cell, and the packaging structure is arranged in the rest height region; when the cell is extruded by the swelling force, after the packing region is opened, thickness of the buffer may be reduced by about 90%, which can greatly increase space released by swelling of the cell; and when the swelling force of the cell is small, to better fill the initial gap between the cell and the housing, the height of the accommodating cavity may be 90% of the height of the cell. Certainly, another height may also be set based on the performance of the cell, for example, 50%-85% or 60%-80%. Such height ratio is small in difference, which better balances a requirement for space release and a requirement for filling of the gap between the cell and the housing.

Therefore, for the manner of the foregoing embodiments, the height of the accommodating cavity is set to be in a specified ratio to the height of the cell, so that the packaging structure can be arranged in the rest height region when the gap in the height direction is not filled fully. The accommodating cavity and the packaging structure are flexibly arranged based on the specific performance of the cell, so that the buffer can be disposed more flexibly.

According to some embodiments of this application, the packaging structure includes at least two levels of packaging regions having different packaging strengths, enabling the packaging regions to be opened level by level as the pressure in the accommodating cavity increases to form level by level the buffer space that communicates with the accommodating cavity. FIG. 4 is a schematic diagram of a structure of a buffer according to an embodiment of this application. The packaging structures used by the buffer use three levels of packaging structures. Certainly, the buffer may alternatively use packaging structures in other forms such as two levels or four levels.

The buffer 300 includes a packaging structure 3010. The packaging structure 3010 includes a first packaging region 3012, a second packaging region 3014, and a third packaging region 3016, where the first packaging region 3012 is close to the accommodating cavity 305. When the buffer is extruded by the swelling force of the cell, the pressure in the accommodating cavity enables the first packaging region to crack first, so that a sealing layer of the first packaging region has a smallest compression and a lowest strength; compared with the first packaging region, the second packaging region has a higher packaging strength; and similarly, the third packaging region has the highest packaging strength, thus achieving the packaging structure with gradiently-changing packaging strengths. There is a strength difference of about 1 N/mm between packaging strengths of different packaging regions. For example, the packaging strength of the first packaging region is 1 N/mm, the packaging strength of the second packaging region is 3 N/mm, and the packaging strength of the third packaging region is 5 N/mm; or the packaging strength of the first packaging region is 1 N/mm, the packaging strength of the second packaging region is 5 N/mm, and the packaging strength of the third packaging region is 8 N/mm. It should be noted that different packaging strength differences embody tolerance to different swelling forces of the cell. Therefore, in actual use, the packaging strength needs to be set based on features of the cell and specific use environments.

Further, as shown in FIG. 4, to enable the sealing regions to release different spaces when cracks, in this embodiment of this application, predetermined lengths are set for different packaging regions. As shown in FIG. 4, a packaging length of the first packaging region 3012 is L2, a packaging length of the second packaging region is L4, and a packaging length of the third packaging region is L6. The packaging lengths of the different packaging regions may be the same or different. With the same packaging lengths, the same space can be released when each packaging region cracks, and with different packaging lengths, different spaces can be released in different stages, where the released spaces can be adjusted. In this application, the packaging length is not particularly limited. In actual use, a user can independently determine the packaging length based on the features of the cell, for example, the swelling force of the cell is small in an early stage of use, and the cell occupies a small space after swelling, so that the packaging length of the first packaging region may be set to be smaller. The swelling force of the cell increases gradually during use of the cell, and the space occupied by the cell when swelling every time increases gradually, so that the packaging length of the second packaging region and the packaging length of the third packaging region may be increased gradually, so as to gradually release a large space.

As the swelling force of the cell increases gradually, the pressure applied to the accommodating cavity by the cell increases gradually. When the pressure is greater than the packaging strength of the first packaging region, the first packing region cracks first. After the first packaging region cracks, the space in the accommodating cavity may increase, and the thickness of the buffer may be reduced. Similarly, after both the second packaging region and the third packaging region crack, the space released by the buffer increases gradually. After the third sealing region is opened, the buffer presents a state with the largest space released, that is, the buffer presents a state with the smallest space occupied. To be specific, the space occupied by the buffer is only thickness of an aluminum-plastic film, where an incompressible thickness is less than or equal to 1 mm, and a mass density is less than or equal to 0.5 kg/m'. This causes a very small influence on volume and weight of the cell.

According to some embodiments provided in this application, the at least two levels of packaging regions are arranged sequentially; and/or the at least two levels of packaging regions are spaced apart, and a buffer region with a predetermined length is disposed between two adjacent levels of the packaging regions.

Further, still referring to FIG. 4, to increase the space that can be released by the buffer when the buffer is extruded by the swelling force of the cell, in this embodiment of this application, the at least two levels of packaging regions are spaced apart, and the buffer region with the predetermined length is disposed between the two adjacent levels of the packaging regions. As shown in FIG. 4, a first buffer region 3011 with a predetermined length is disposed between the accommodating cavity 305 and the first packaging region 3012, where the first buffer region 3011 is a region that is not heat sealed. The region that is not heat-sealed refers to that sealing layers of a material of the buffer only fit together instead of being heat-sealed. In this way, when the accommodating cavity 305 is extruded by the swelling force of the cell, the aluminum-plastic film that is not heat-sealed is opened to release more space.

As shown in FIG. 4, the first buffer region 3011 with a length of L1 is disposed between the accommodating cavity 305 and the first packaging region 3012, a second buffer region 3013 with a length of L3 is disposed between the first packaging region 3012 and the second packaging region 3014, and a third buffer region 3015 with a length of L5 is disposed between the third packaging region 3016 and the second packaging region 3014. The packaging structure 3010 is divided into a plurality of packaging regions by a plurality of buffer regions described above, which can block heat radiation between different packaging regions and can also provide more released space for the accommodating cavity. The lengths of the different buffer regions may be set based on the needs and may be the same or different. With the same lengths of the buffer regions, the same space can be released when each packaging region cracks, and with different lengths of the buffer regions, different spaces can be released in different stages, where the released spaces can be adjusted. In this application, the length of the buffer region is not particularly limited. In actual use, a user can independently determine the length of the buffer region based on the features of the cell, for example, the swelling force of the cell is small in an early stage of use, and the cell occupies a small space after swelling, so that the length of the first buffer region can be set to be smaller. The swelling force of the cell increases gradually during the use of the cell, and the space occupied by the cell when swelling every time increases gradually, so that the length of the second buffer region and the length of the third buffer region can be increased gradually, so as to gradually release a large space.

Figure 7:
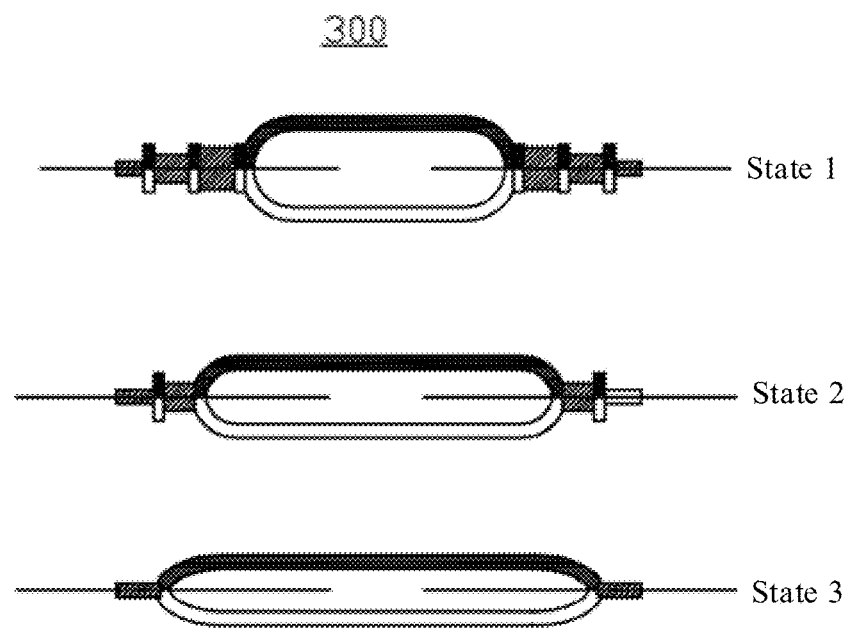
FIG. 7 is a use state diagram of a buffer according to an embodiment of this application.

To more accurately describe a change state of the buffer during use of the battery unit, in FIG. 7, an embodiment of this application provides a state change process of a buffer with packaging regions spaced apart in use. FIG. 7 is a schematic diagram of a working state of the buffer when the buffer is extruded by the swelling force of the cell. State 1 is a state in which a small swelling force is applied to the buffer by the cell, where the buffer regions and the packaging regions of the buffer are all in an initial state. When the accommodating cavity of the buffer is extruded by the swelling force of the cell, the buffer region that is not heat-sealed can bear the smallest pressure, so that the first buffer region is opened first. When pressure applied to the first packaging region in the accommodating cavity is greater than the packaging strength of the first packaging region, the first packaging region and the second buffer region are opened to form a buffer space that communicates with the accommodating cavity. As shown in state 2 in FIG. 7, the accommodating cavity has a thickness significantly reduced and a length increased, so as to release more space for swelling of the cell. When the swelling force applied to the buffer by the cell further increases, the accommodating cavity further extrudes the second packaging region. When pressure applied to the second packaging region is greater than the packaging strength of the second packaging region, the second packaging region and the third buffer region are opened to form a buffer space that communicates with the accommodating cavity. As shown in state 3 in FIG. 7, the thickness of the accommodating cavity is further reduced, and the length of the accommodating cavity is further increased, so as to release more space for swelling of the cell.

Typically, sealing strength of the third packaging region is set to be large, so that the third packaging region is unable to be opened generally. However, in an extreme case, when the swelling force applied to the buffer by the cell is greater than the packaging strength of the third packaging region, the accommodating cavity is fully opened, two sides of the accommodating cavity fully fit together, and the space occupied is only the thickness of the aluminum-plastic film on the two sides of the accommodating cavity. Thus, it can be learned that the provision of multiple levels of packaging regions provides more buffer space for swelling of the cell and significantly relieves the influence caused by the swelling force of the cell.

Figure 8:
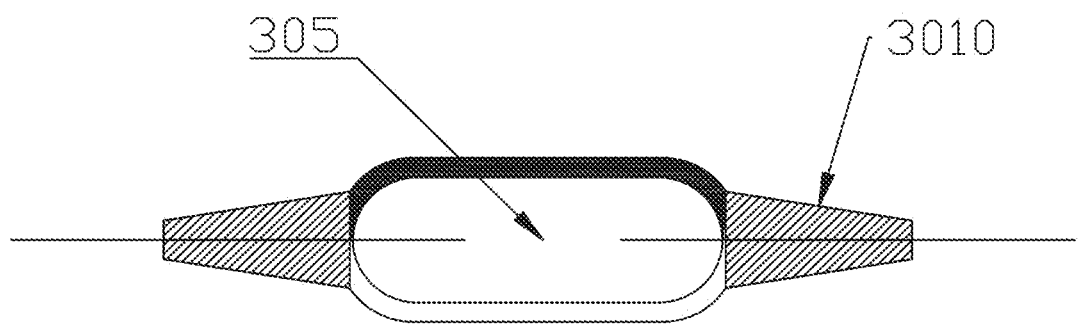
FIG. 8 is a cross-sectional view of another buffer according to an embodiment of this application.

In this embodiment of this application, the at least two levels of packaging regions may alternatively be arranged sequentially. Specifically, as shown in FIG. 8, the packaging structure 3010 of the buffer 300 is a trapezoidal structure, where packaging regions of the packaging structure 3010 are arranged sequentially; a sealing layer of one side of the packaging structure 3010 close to the accommodating cavity 305 is small in compression and low in strength; and a sealing layer of a packaging region farther away from the accommodating cavity 305 is large in compression and high in strength and has a high packaging strength. For example, strength of the sealing layer on a longer side may be 1 N/mm, strength of the sealing layer on a shorter side may be 5 N/mm, and the packaging strength of the packaging structure gradually increases from 1 N/mm to 5 N/mm. In actual use, the packaging strength needs to be set based on features of the cell and specific use environments. Preferably, the packaging strength may be set to be 0.1-50 MPa. In this embodiment, the packaging strengths of trapezoidal packaging structures that can package sequentially change gradually, so that the packaging structure 3010 is in a gradually cracking state as the swelling force applied to the accommodating cavity by the cell increases gradually, enabling the space released by the buffer 300 to have a high continuity, thereby avoiding abrupt change of the space when the packing structures spaced apart release space, making resistance applied to the cell by the buffer more steady, and significantly prolonging service life of the battery unit.

Figure 9:
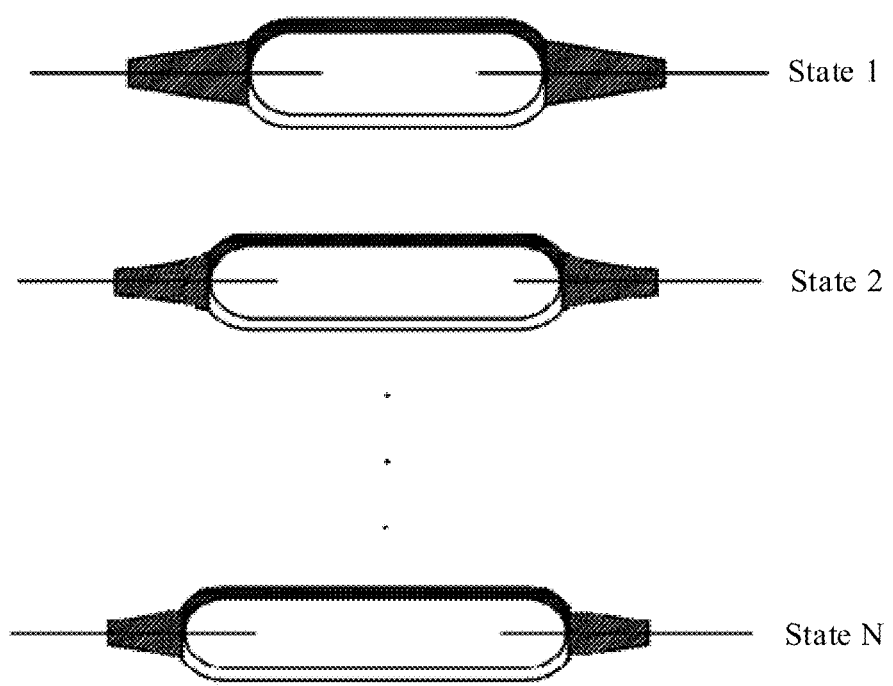
FIG. 9 is a use state diagram of another buffer according to an embodiment of this application.

To more accurately describe a change state of the buffer during use of the battery unit, in FIG. 9, an embodiment of this application provides a state change process of a buffer with packaging regions arranged sequentially in use. As shown in FIG. 9, the swelling force of the cell increases gradually during use of the battery unit, and the packaging region cracks gradually under pressure of the accommodating cavity. From state 1 to state 2, the thickness of the buffer is reduced gradually, and the length of the accommodating cavity is increased gradually; and from state 2 to state N, the accommodating cavity is thinned gradually. The packaging region cracks gradually to avoid shake of the cell caused by the gap between the cell and the buffer as an excessively large space is released at a time. The trapezoidal packaging structures of the packaging regions are arranged sequentially, so that abrupt change of the released space caused by the buffer can be well avoided, thereby releasing the space for swelling of the cell, enabling the pressure applied to the cell by the buffer to be relatively persistent, and prolonging the service life of the battery unit.

According to some embodiments provided in this application, at least two levels of packaging regions are arranged in the height direction of the cell, and the packaging region farther away from the accommodating cavity has a high packaging strength. As shown in FIG. 4 and FIG. 8, when the accommodating cavity 305 is extruded by the swelling force of the cell, the at least two levels of packaging regions 3010 which are arranged sequentially or spaced apart need to be opened separately. To be opened conveniently, the at least two levels of packaging regions 3010 are arranged in the height direction of the cell, so that the packaging regions 3010 can be opened in the height direction of the cell to expand the space. Further, to enable the packaging structure to be opened gradually, as shown in FIG. 4 and FIG. 8, a sealing layer of one side of the packaging structure 3010 close to the accommodating cavity 305 is small in compression and low in strength; and a sealing layer of a packaging region farther away from the accommodating cavity 305 is large in compression and high in strength and has a high packaging strength. The at least two levels of the packaging regions are arranged in the height direction of the cell, and the packaging strength of the packaging region farther away from the accommodating cavity is set to be high, which can enable the buffer to be very likely to expand gradually in the height direction of the cell and release space gradually as swelling pressure of the cell increases.

According to some embodiments provided in this application, the pressure in the accommodating cavity is greater than or equal to pressure in the battery unit. The housing provides an initial gap for swelling of the cell in use. The presence of this gap may increase a movement space of the cell in the housing, enable a winding structure of the cell to loosen, and in turn cause wrinkles of the positive electrode plate and the negative electrode plate and lead to lithium precipitation. Therefore, in the embodiments of this application, the pressure in the accommodating cavity is set to be greater than or equal to the pressure in the battery unit. For example, in an initial state, the pressure in the battery unit is 0.1-0.2 MPa, so that the pressure in the accommodating cavity may be set to be 0.1-0.5 MPa. The pressure in the accommodating cavity is greater than the pressure in the battery unit, so that the accommodating cavity may generate a specified pressure on the cell, so as to enable the battery unit to still maintain a fully-filled state when the battery unit has a low group margin, thereby preventing lithium precipitation caused by wrinkles of the electrode plate.

According to some embodiments provided in this application, the packaging strength of the packaging structure of the buffer is 0.1-50 MPa. To seal a substance in the accommodating cavity and enable the packaging structure to crack in time after the cell swells to some extent, the buffer has strict requirements on the packaging strength of the packaging structure. On the one hand, the packaging strength needs to be greater than the pressure of the substance in the accommodating cavity. On the other hand, the packaging structure needs to crack quickly after the swelling force generated by the cell reaches a specified threshold. The pressure in the accommodating cavity is generally 0.1-0.2 MPa, and the pressure when the cell swells needs to be considered as well. Therefore, a range of the packaging strength is preferably 0.1-50 MPa. In addition, the packaging region farther away from the accommodating cavity has a high packaging strength. Therefore, different packaging regions have different packaging strengths, for example, packaging strength of a packaging region closest to the accommodating cavity is 0.1 MPa, and packaging strength of a packaging region farthest away from the accommodating cavity is 50 MPa.

Figure 10:
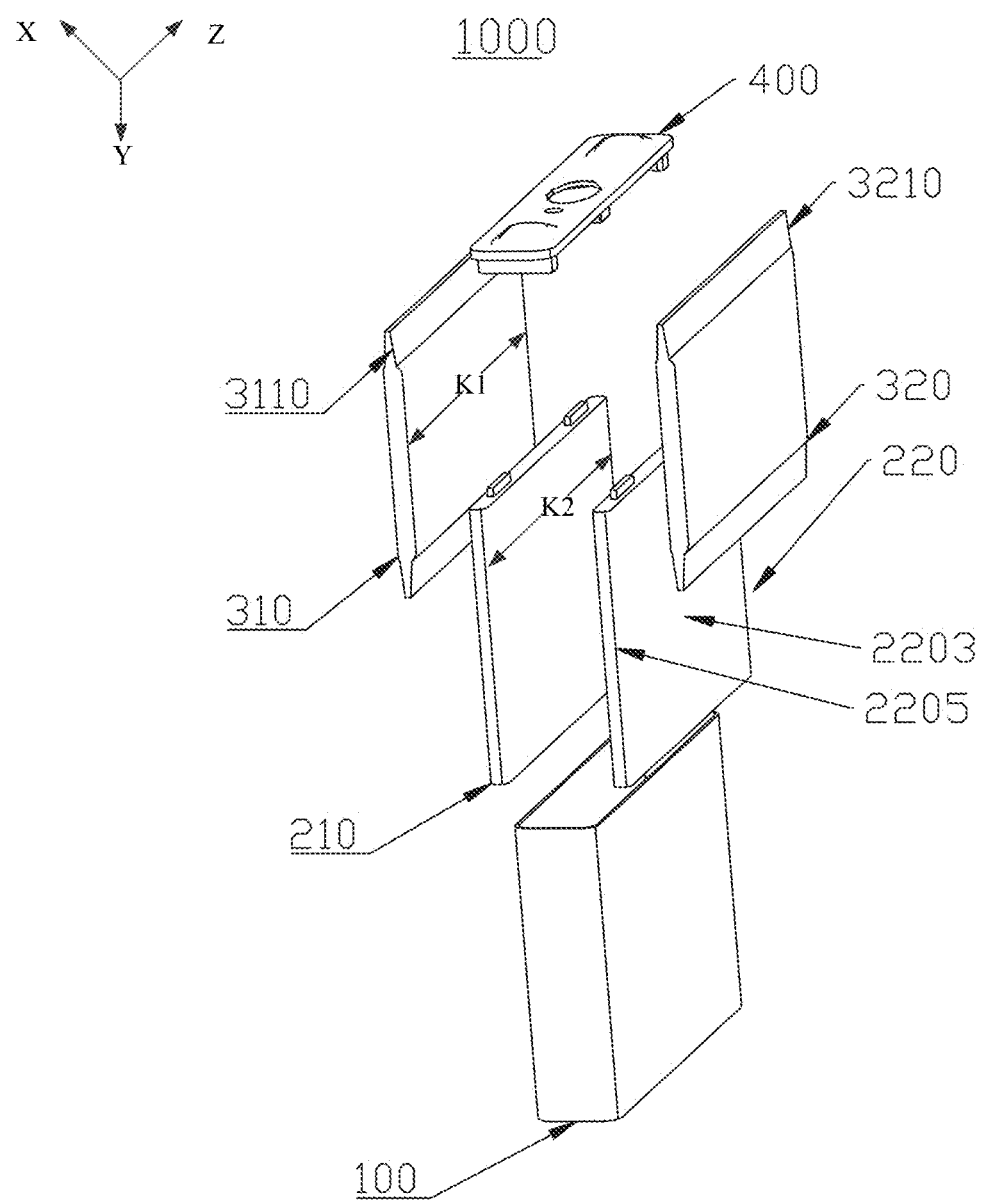
FIG. 10 is an exploded view of a battery unit according to an embodiment of this application.

According to some embodiments provided in this application, the cell is a prismatic cell, where the buffer is disposed at one or two ends of the cell in a thickness direction; and/or the buffer is disposed at one or two ends of the cell in a width direction. As shown in FIG. 10, for ease of description, the height direction of the cell is defined as a Y-axis direction, the thickness direction of the cell is defined as an X-axis direction, and the width direction of the cell is defined as a Z-axis direction. In the embodiments of this application, the buffer is disposed at one or two ends of the cell in the thickness direction. As shown in FIG. 10, the battery unit 1000 includes a housing 100, a first cell 210, a second cell 220, a first buffer 310, a second buffer 320, and an end cover 400. The first cell 210 and the second cell 220 are the same in structure. The second cell 220 is used as an example for description of the embodiments of this application. As shown in FIG. 10, the second cell 220 is a prismatic structure and includes a second cell first side wall 2203 and a second cell first corner 2205, where the second cell first side wall 2203 is one end of the cell 200 in the thickness direction (that is, a side wall in the Z-axis direction), and the second cell first corner 2205 is one end of the cell 200 in the width direction (that is, a side wall in the X-axis direction). The first buffer 310 includes a first packaging structure 3110, and the second buffer 320 includes a second packaging structure 3210.

The second buffer 320 is disposed between an inner wall of the housing 100 and the second cell first side wall 2203, and the first buffer 310 is also disposed between a side wall of the first cell 210 and the inner wall of the housing 100. Certainly, a buffer may be additionally disposed between side walls of the first cell 210 and the second cell 220 to increase a swelling space of the cell. The buffer being disposed at one or two ends of the cell in the thickness direction can enable the cell to respectively provide space for swelling of the cell on two sides of the cell in use.

Figure 11:
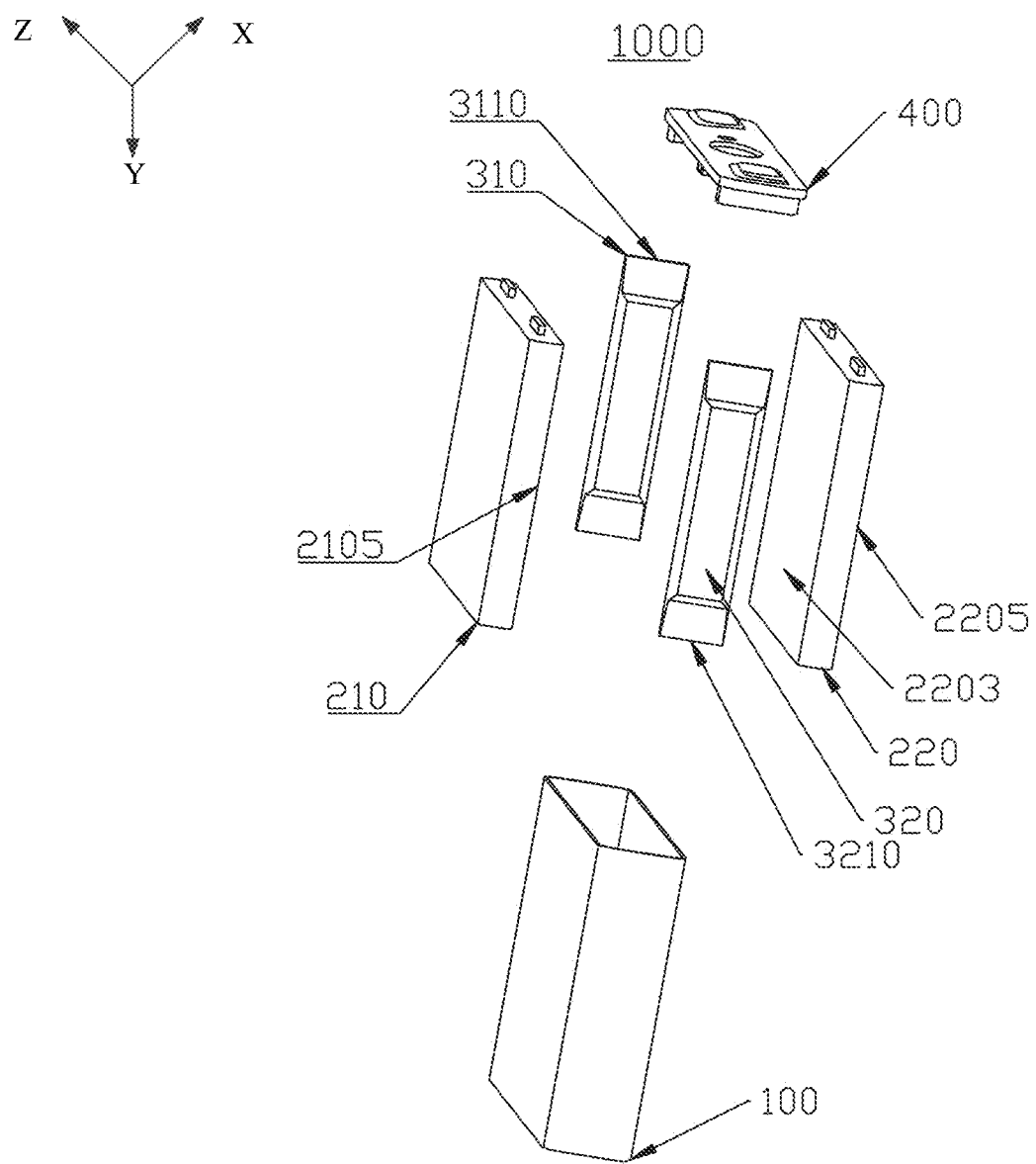
FIG. 11 is an exploded view of another battery unit according to an embodiment of this application.

FIG. 11 is a structural diagram of another battery unit according to an embodiment of this application. In this embodiment, the buffer is disposed at one or two ends of the cell in the width direction. As compared with FIG. 10, the second buffer 320 is disposed at one side of the second cell first corner 2205, and width of the second buffer 320 is equal to a sum of thicknesses of the first cell 210 and the second cell 220. Similarly, the first buffer 310 may also be disposed at one side of another corner of the first cell 210 and the second cell. Packaging regions of the first buffer and the second buffer may be located in the height direction of the cell (that is, the Y-axis direction) and may alternatively be located in the thickness direction of the cell (that is, the X-axis direction).

Further, for the battery units in FIG. 10 and FIG. 11, the buffer may alternatively be disposed at one or two ends of the cell in the thickness direction and disposed at one or two ends of the cell in the width direction. That is, the buffer is disposed on all side walls of the cell. Through the manner, the swelling force of the cell in all directions can be relieved.

According to some embodiments provided in this application, when the buffer is disposed at one or two ends of the cell in the thickness direction, the width of the accommodating cavity is 50%-100% of the width of the cell in the width direction of the cell. As shown in FIG. 10, the first buffer 310 is respectively disposed at one or two ends of the first cell 210 and the second cell 220 in the thickness direction. The width of the cell is K2, and the width of the buffer is K1. To better enable the buffer to fit with the side wall of the cell, typically, when the packaging structure of the buffer is located at one or two ends of the cell in the height direction, the width of the buffer and the width of the accommodating cavity are the same; preferably, a maximum width of the accommodating cavity is 100% of the width of the cell; and the width of the accommodating cavity may alternatively be set to be 80% of the width of the cell based on swelling of the cell, so as to leave proper space on two sides of the cell. Similarly, when the cell has a small swelling coefficient, the width of the accommodating cavity may be set to be 50% of the width of the cell. It should be noted that a ratio of the width of the accommodating cavity and the width of the cell may be adjusted based on swelling of the cell and be adjusted within the above range based on actual needs.

According to some embodiments provided in this application, a cross section of the accommodating cavity in the height direction of the cell is ring-shaped and persistently encircles the cell. In some embodiments of this application, buffers of various shapes are further provided to fit with cell structures of different shapes, for example, a buffer of a ring-shaped cylindrical structure, a rectangular buffer, and a buffer of a polygonal ring-shaped structure.

Figure 12:
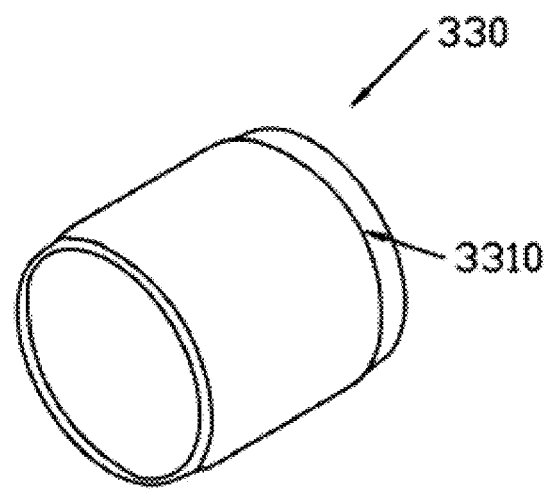
FIG. 12 is a schematic diagram of a ring-shaped buffer according to an embodiment of this application.

FIG. 12 is a schematic diagram of a ring-shaped buffer 330 provided in the embodiments of this application. The ring-shaped buffer 330 is a ring-shaped cylindrical structure and fits with a cylindrical cell. The ring-shaped buffer 330 includes a ring-shaped packaging structure 3310, where the ring-shaped packaging structure 3310 is located at one or two ends of the ring-shaped buffer 330 in the height direction of the cell. When the ring-shaped buffer 330 and the cylindrical cell are disposed together, the ring-shaped buffer persistently encircles the cell. A cross section of an accommodating cavity of the ring-shaped buffer in the height direction of the cell is ring-shaped.

Figure 13:
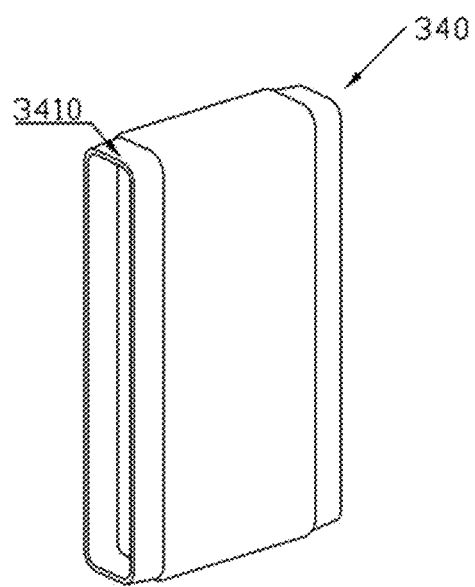
FIG. 13 is a schematic diagram of a rectangular buffer according to an embodiment of this application.

FIG. 13 shows a rectangular buffer 340 provided in the embodiments of this application. The rectangular buffer 340 is a rectangular ring-shaped structure and fits with a prismatic cell. The rectangular buffer 340 includes a packaging structure 3410. A cross section of an accommodating cavity of the rectangular buffer in the height direction of the cell is rectangular and persistently encircles the cell. The rectangular packaging structure is located at one or two ends of the rectangular buffer in the height direction of the cell. The rectangular buffer 340 wraps around the cell in use.

In the foregoing embodiments, the buffer being disposed as a plurality of ring-shaped structures can encircle the cell and form buffer around the cell. In this way, gaps in all positions of the cell and the housing in an initial state can be effectively filled, so as to avoid lithium precipitation caused by shake of the cell; and in addition, space can also be provided for swelling of the cell in all directions around the cell when the cell swells.

Figure 14:
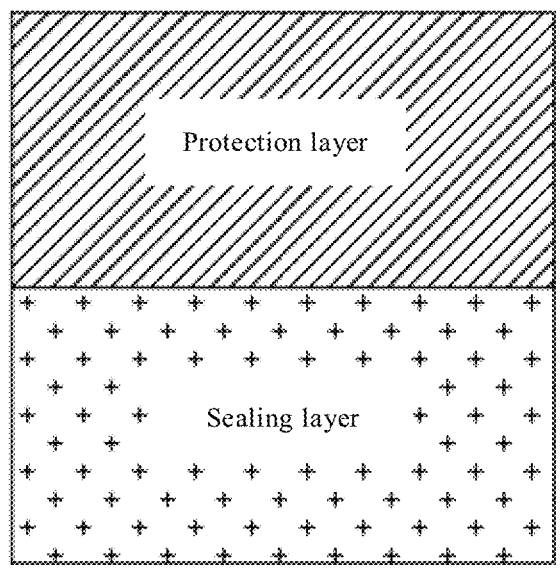
FIG. 14 is a structural diagram of a material of a buffer according to an embodiment of this application.

According to some embodiments provided in this application, a material of the buffer 300 is provided with an outer protection layer and an inner sealing layer, and the packaging region of the buffer is formed by heat sealing of the inner sealing layer. FIG. 14 is a schematic structural diagram of the material of the buffer. The protection layer is located at an outer layer of the buffer, mainly functions as scratch resistance and corrosion resistance, and may be polyester resin, polyamide resin, teflon, and aluminum alone or a combination of several of them. The inner sealing layer mainly functions as tightly packaging to isolate communication between inner and outer substances, and may be polyolefin, resin, and silicone adhesive alone or a combination of several of them. The aluminum-plastic film has good elasticity and is capable of fully releasing a swelling force during charge and discharge, guaranteeing uniformity of a swelling force in a central region, reducing polarization difference, and avoiding local lithium precipitation or breakage of an electrode plate caused by polarization. Preferably, in the embodiments of this application, the aluminum-plastic film is used as a material for making the buffer. It should be noted that another material may alternatively be used to replace the aluminum-plastic film to make the buffer, provided that the requirements of elasticity and sealing can be met, which is not limited herein by this application.

Figure 15:
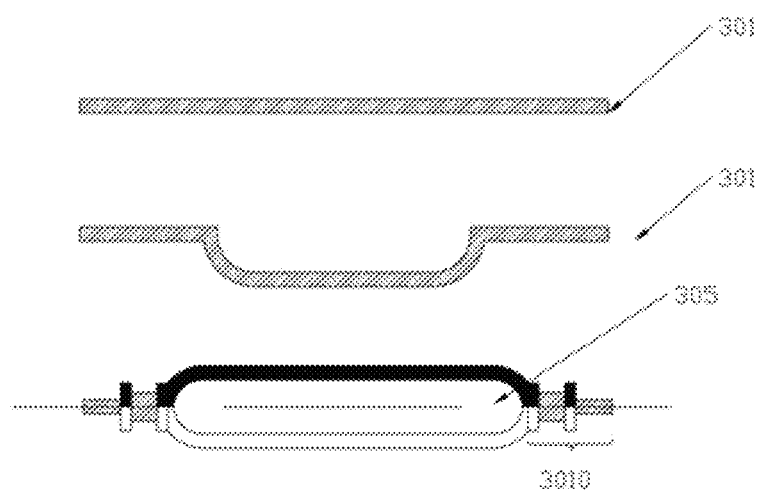
FIG. 15 is a schematic diagram of forming of a buffer according to an embodiment of this application.

In some embodiments of this application, FIG. 15 shows a forming process of a buffer 300 and a cross-sectional view of the buffer 300. The buffer is formed by an aluminum-plastic film 301 through pressing. A pocket with a specified depth and area is formed in the center of the aluminum-plastic film 301 through a pocket punching process using a mold. The aluminum-plastic film punched is heat-sealed together through a heat sealing process. During heat sealing, the inner sealing layer is melted and then bonds together to form a packaging region 3010. The packaging region 3010 seals the pocket to form an accommodating cavity 305. The inner sealing layer functions as sealing a substance in the accommodating cavity. The outer protection layer protects the sealing layer. During forming, two aluminum-plastic films formed by pressing are sealed opposite each other from the top to the bottom to form a buffer. Alternatively, one aluminum-plastic film punched may be folded and then directly sealed to form a buffer. After the aluminum-plastic film is punched and sealed, at least one packaging structure and an accommodating cavity are formed at the periphery of the buffer. Certainly, it should be noted that the heat sealing process is used as an example for description of forming of the packaging region in the foregoing embodiments. Optionally, the packaging region may alternatively be formed by another process such as bonding using an adhesive, which is not limited herein. The foregoing process structure being used features a simple manufacture process and a good sealing effect and can be easily made into various buffers that are adaptable to a structure of a cell.

According to some embodiments provided in this application, the accommodating cavity of the buffer is filled with an inert fluid inside. In the embodiments of this application, to enhance a use effect of the buffer, during packaging, the accommodating cavity of the buffer in the embodiments of this application may be internally filled with a deformable fluid substance, for example, argon, nitrogen, paraffin, or silicone oil. On a condition that a non-pure liquid is filled, pressure in the accommodating cavity is not lower than pressure in a residual space in the cell (typically, the pressure in the cell is 0.1-0.2 MPa). On a condition that a pure liquid is filled, the accommodating cavity is fully filled. In the embodiments of this application, the accommodating cavity being filled with the inert substance inside avoids swelling of the accommodating cavity of the buffer caused by a substance or a material included in the buffer as the temperature of the cell increases, thereby avoiding extrusion on the swelling space of the cell caused by swelling of the buffer.

Figure 16:
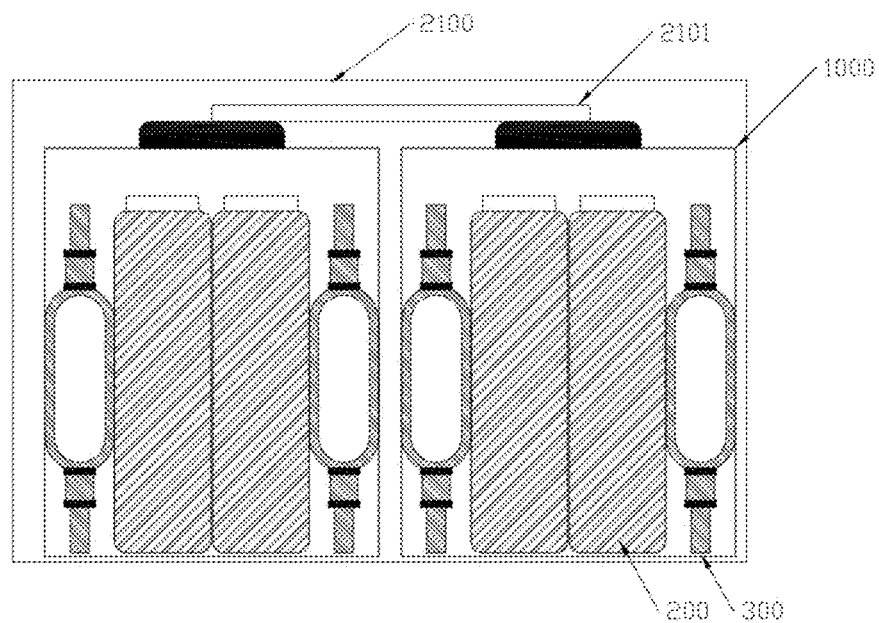
FIG. 16 is a schematic structural diagram of a battery according to an embodiment of this application.

According to some embodiments provided in this application, a battery 2100 is further provided. As shown in FIG. 16, the battery may include one or more battery units 1000 described in the foregoing embodiments and a busbar 2101.

The busbar 2101 is configured to implement series or parallel electrical connection between the one or more battery units 1000.

The one or more battery units 1000 include at least a cell 200 and a buffer 300, where the buffer 300 uses the packaging structure mentioned in the foregoing embodiments, is disposed corresponding to a side wall of the cell 200, and is configured to open the packaging structure when the cell 200 swells, so as to provide a buffer space for swelling of the cell.

According to some embodiments provided in this application, an electric apparatus is further provided. The electric apparatus includes the battery 2100 provided in the foregoing embodiments, where the battery is configured to provide electrical energy for the electric apparatus. The electric apparatus may be but is not limited to a mobile phone, a tablet, a laptop computer, an electric toy, an electric tool, an electric bicycle, an electric vehicle, a ship, a spacecraft, or the like. The electric toy may be a fixed or mobile electric toy, for example, a game console, an electric toy car, an electric toy ship, and an electric toy airplane. The spacecraft may include an airplane, a rocket, a space shuttle, a spaceship, and the like.

Figure 17:
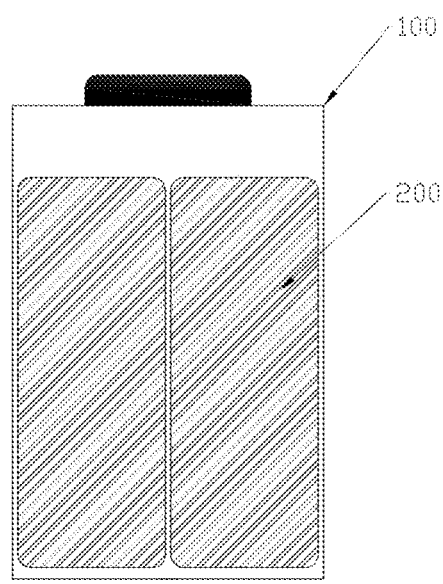
FIG. 17 is a cross-sectional view of a battery unit under test 1 according to an embodiment of this application.
Figure 18:
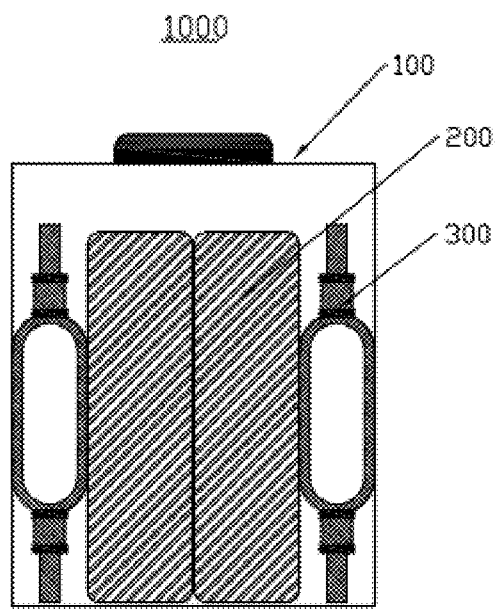
FIG. 18 is a cross-sectional view of a battery unit under test 2 according to an embodiment of this application.
Figure 19:
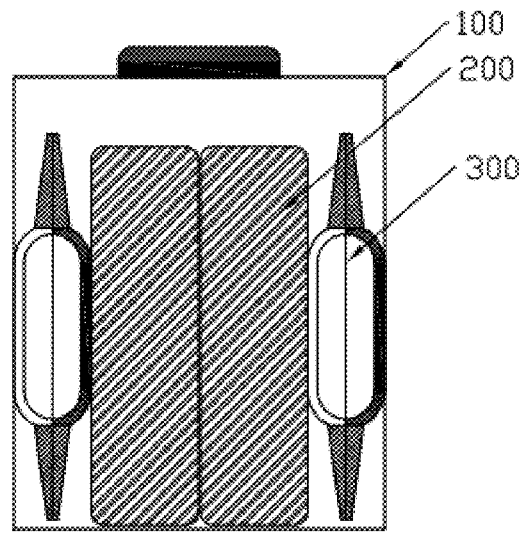
FIG. 19 is a cross-sectional view of a battery unit under test 3 according to an embodiment of this application.

For better implementation of the technical effects of the technical solutions provided in the embodiments of this application, this applicant performs tests on the swelling force of the cell of the battery unit provided in FIG. 17 to FIG. 19. FIG. 17 shows a common battery unit structure. In the battery unit structure, no buffer is used for processing the swelling force. In a battery unit shown in FIG. 18, a buffer is disposed between a side wall of a cell and a housing. The buffer is used to package using packaging structures that are spaced apart. In a battery unit shown in FIG. 19, a buffer is disposed between a side wall of a cell and a housing, where the buffer is used to package using trapezoidal packaging structures that can package sequentially.

This applicant has carried out the following tests on the battery units using the foregoing three structures.

Test 1:

As shown in FIG. 17, the structure of the battery unit included a cell 200, a housing 100, and no buffer. An LFP positive electrode, a negative electrode, and a separator were wound into a wound cell. Then the wound cell was cold pressed, followed by processes of performing tab welding, putting the wound cell into the housing, performing top cover welding, baking, and injecting an electrolyte until a finished cell fell into a compartment. A finished battery unit had a size of 40×200×100 mm. A full-charge group margin of the wound cell (full-charge group margin of wound cell=thickness of wound cell in 100% SOC state/internal thickness of housing) was 98%. A full-charge group margin of the cell (full-charge group margin of cell=(thickness of wound cell in 100% SOC state+initial thickness of buffer cavity)/internal thickness of housing) was 98%. A rated capacity was 100 Ah. The battery unit was tested with a clamp having three aluminum plates and a sensor. An initial clamp force was 1000 N; a 1C/1C cycling retention rate test was performed using a thermostat at a temperature of 25° C., and swelling force data was recorded in a real-time manner until the capacity decayed to 90% SOH.

Test 2:

The battery unit in FIG. 18 included a cell 200, a housing 100, and a buffer 300. A thickness of an aluminum-plastic film used was 150 μm, where a thickness of a protection layer was 70 μm, and a thickness of a sealing layer was 80 μm. The buffer 300 used a design with two levels of sealing layers, where a first packaging region was hot pressed under 100 kgf at 180° C. for 1 s, with a width of 1 mm and a strength of 3 N/mm; and a second packaging region was hot pressed under 150 kgf at 190° C. for 2s, with a width of 1 mm and a strength of 8 N/mm. An LFP positive electrode, a negative electrode, and a separator were wound into a wound cell. Then the wound cell was cold pressed, followed by processes of performing tab welding, putting the wound cell into the housing, performing top cover welding, baking, injecting an electrolyte, and performing formation until a finished battery unit fell into a compartment. The finished battery unit had a size of 40×200×100 mm. A full-charge group margin of the wound cell was 93%. A full-charge group margin of the cell was 98%. A rated capacity was 95 Ah. The battery unit was tested with a clamp having three aluminum plates and a sensor. An initial clamp force was 1000 N; a 1C/1C cycling retention rate test was performed using a thermostat at a temperature of 25° C., and swelling force data was recorded in a real-time manner until the capacity decayed to 90% SOH.

Test 3:

The battery unit in FIG. 19 included a cell 200, a housing 100, and a buffer 300. A thickness of an aluminum-plastic film used was 150 μm, where a thickness of a protection layer was 70 μm, and a thickness of a sealing layer was 80 μm. The buffer used a design with a trapezoidal packaging structure and was subjected to hot pressing and hypotenuse sealing under 200 kgf at 180° C. for 3s, with a longer side strength of 3 N/mm and a shorter side strength of 10 N/mm. A cross-sectional view of a structure of the battery unit was shown in FIG. 19. The battery unit includes a cell, a buffer, and a housing. An LFP positive electrode, a negative electrode, and a separator were wound into a wound cell. Then the wound cell was cold pressed, followed by processes of performing tab welding, putting the wound cell into the housing, performing top cover welding, baking, and injecting an electrolyte until a finished battery unit fell into a compartment. The finished battery unit had a size of 40×200×100 mm. A full-charge group margin of the wound cell was 93%. A full-charge group margin of the cell was 98%. A rated capacity was 95 Ah. The battery unit was tested with a clamp having three aluminum plates and a sensor. An initial clamp force was 1000 N; a 1C/1C cycling retention rate test was performed using a thermostat at a temperature of 25° C., and swelling force data was recorded in a real-time manner until the capacity decayed to 90% SOH.

The test results are shown in table 1 below.

TABLE 1

| No. | Arrangement of buffer | Structure of buffer | Swelling force |
|---|---|---|---|
| Test 1 | N/A | N/A | 8000N |
| Test 2 | 2 | Two-level packaging buffer | 5000N |
| Test 3 | 2 | Trapezoidal packaging buffer | 5000N |

Through the foregoing tests, when results of test 2 and test 3 are compared with results of test 1, it can be learned that after addition of the buffer provided in the embodiments of this application to the battery unit, the swelling force of the entire battery unit significantly drops from the original 8000 N to 5000 N, with a drop amplitude reaching 37.5%. Therefore, the addition of the buffer to the battery unit in the solutions provided in the embodiments of this application greatly reduces the swelling force of the battery unit and well resolves the problems in the prior art.

Therefore, in conclusion, in the embodiments of this application, the buffer is disposed corresponding to the cell. In this way, on the one hand, the initial gap between the cell and the housing can be effectively filled when the cell does not swell, thus preventing the cell winding structure from loosening and avoiding lithium precipitation on the electrode plate; and on the other hand, when the cell swells in use, the buffer may deform under extrusion caused by swelling of the cell; when the swelling pressure of the cell is small, the buffer has a small deformation; however, the packaging region of the buffer is opened gradually and the space of the accommodating cavity increases gradually as the swelling pressure of the cell gradually increases to some extent, so that the deformation of the buffer also increases gradually, thus relieving the pressure caused by swelling of the cell, implementing filling of the gap between the cell and the housing by the buffer in a full life cycle of the cell, reducing the influence of swelling of the cell on the electrode plate, and avoiding lithium precipitation.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. They should all be covered in the scope of claims and summary in this application. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A battery unit, comprising:
    a housing;
    at least one cell, accommodated in the housing; and
    a buffer, accommodated in the housing and disposed corresponding to a side wall of the cell,
    wherein the buffer is provided with an accommodating cavity, a periphery of the accommodating cavity comprises at least one packaging structure, the packaging structure comprises at least one level of packaging region with a predetermined length, and when pressure in the accommodating cavity exceeds packaging strength of the packaging structure, the packaging region is opened to form a buffer space that communicates with the accommodating cavity.

2. The battery unit according to claim 1, wherein the side wall comprises a middle side wall portion located in middle regions of two ends of the cell in a height direction, and the buffer is disposed corresponding to the middle side wall portion.

3. The battery unit according to claim 1, wherein the buffer is disposed between the cell and a side wall of the housing; and/or the buffer is disposed between adjacent ones of the cells.

4. The battery unit according to claim 1, wherein the packaging structure is located at one or two ends of the buffer in the height direction of the cell.

5. The battery unit according to claim 4, wherein in the height direction of the cell, height of the accommodating cavity is 10-90% of height of the cell.

6. The battery unit according to claim 1, wherein the packaging structure comprises at least two levels of packaging regions having different packaging strengths, enabling the packaging regions to be opened level by level as pressure in the accommodating cavity increases to form level by level the buffer space that communicates with the accommodating cavity.

7. The battery unit according to claim 1, wherein
    the at least two levels of packaging regions are arranged sequentially; and/or
    the at least two levels of packaging regions are spaced apart, and a buffer region with a predetermined length is disposed between two adjacent levels of the packaging regions.

8. The battery unit according to claim 6, wherein the at least two levels of packaging regions are arranged in the height direction of the cell, and the packaging region farther away from the accommodating cavity has a high packaging strength.

9. The battery unit according to claim 1, wherein the pressure in the accommodating cavity is greater than or equal to pressure in the battery unit.

10. The battery unit according to claim 1, wherein the packaging strength of the packaging structure is 0.1-50 MPa.

11. The battery unit according to claim 1, wherein the cell is a prismatic cell, and
    the buffer is disposed at one or two ends of the cell in a thickness direction; and/or
    the buffer is disposed at one or two ends of the cell in a width direction.

12. The battery unit according to claim 11, wherein when the buffer is disposed at one or two ends of the cell in the thickness direction, width of the accommodating cavity is 50-100% of width of the cell in the width direction of the cell.

13. The battery unit according to claim 1, wherein a cross section of the accommodating cavity in the height direction of the cell is ring-shaped and persistently encircles the cell.

14. The battery unit according to claim 1, wherein a material of the buffer is provided with an outer protection layer and an inner sealing layer, and the packaging region is formed by heat sealing of the inner sealing layer.

15. The battery unit according to claim 1, wherein the accommodating cavity is filled with an inert fluid inside.

16. A battery, comprising the battery unit according to claim 1.

17. An electric apparatus, comprising the battery according to claim 16, wherein the battery is configured to supply electrical energy.

* * * * *